(12) United States Patent
Ivanov

(10) Patent No.: US 10,878,324 B2
(45) Date of Patent: Dec. 29, 2020

(54) PROBLEM ANALYSIS AND PRIORITY DETERMINATION BASED ON FUZZY EXPERT SYSTEMS

(75) Inventor: Plamen Valentinov Ivanov, Sofia (BG)

(73) Assignee: ENT. SERVICES DEVELOPMENT CORPORATION LP, Houston, TX (US)

( * ) Notice: Subject to any disclaimer, the term of this patent is extended or adjusted under 35 U.S.C. 154(b) by 627 days.

(21) Appl. No.: 14/395,445

(22) PCT Filed: Jul. 20, 2012

(86) PCT No.: PCT/US2012/047501
§ 371 (c)(1),
(2), (4) Date: Feb. 23, 2015

(87) PCT Pub. No.: WO2014/014470
PCT Pub. Date: Jan. 23, 2014

(65) Prior Publication Data
US 2015/0286949 A1    Oct. 8, 2015

(51) Int. Cl.
*G06F 9/44* (2018.01)
*G06N 7/02* (2006.01)
*G06N 5/04* (2006.01)

(52) U.S. Cl.
CPC .................... *G06N 5/048* (2013.01)

(58) Field of Classification Search
CPC ........ G06N 5/048; G06N 7/02; G06N 3/0436; G06N 5/025; G06N 5/022; G06N 3/126; G06N 5/02; G06N 7/023; G06N 99/005; G06N 5/00; G06N 7/04; G06N 7/046; G06N 3/08; G06N 5/04; G06F 19/345; G06F 17/30424; G06F 17/30705; G06F 11/3466; G06F 17/30731; G06F 11/2028; G06F 11/3409; G06F 11/3447; G06F 17/18; G06F 17/30303; G06F 17/30675; G06F 19/12; G06F 19/20; G06F 21/41; G06F 2211/009; G06F 2221/2113; G06F 8/10; G06F 8/24; G06F 8/36; G06F 8/72
See application file for complete search history.

(56) References Cited

U.S. PATENT DOCUMENTS 5,524,176 A    6/1996 Narita et al.
5,815,638 A    9/1998 Lenz et al.
(Continued)

OTHER PUBLICATIONS

Bojadziev, et al. "Fuzzy Logic for Business, Finance, and Management"; Adances in Fuzzy Systems—Applications & Theory vol. 12; Jan. 1997: 9 pages.

(Continued)

*Primary Examiner* — Luis A Sitiriche
(74) *Attorney, Agent, or Firm* — Sheppard Mullin Richter & Hampton LLP

(57) ABSTRACT

A method for analysis of problems is described, comprising receiving values for a plurality of input parameters specifying a problem, analyzing the values of the plurality of input parameters with a fuzzy expert system thereby calculating a fuzzy result, including a value of a linguistic variable and a crisp value, and determining a priority of the problem, wherein the priority is determined based on the value of the linguistic variable and the crisp value of the fuzzy result. Furthermore, a corresponding problem analysis system is provided.

19 Claims, 4 Drawing Sheets

(56) References Cited

U.S. PATENT DOCUMENTS

Figure 1:
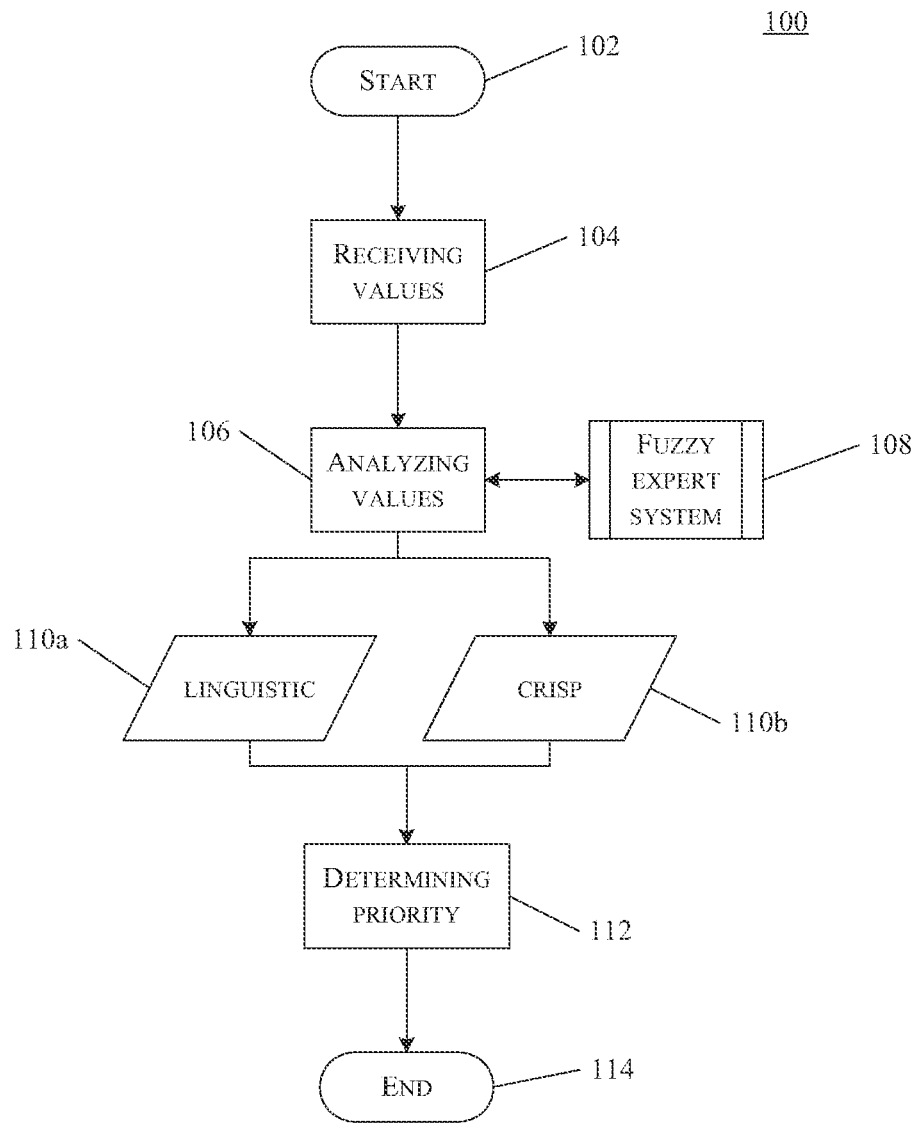

| | | | | |
|---|---|---|---|---|
| 5,978,785 | A | * | 11/1999 | Johnson .................. G06N 5/04 |
| | | | | 706/54 |
| 6,137,907 | A | * | 10/2000 | Clark ................ H04N 1/40062 |
| | | | | 382/176 |
| 6,483,808 | B1 | | 11/2002 | Rochberger et al. |
| 6,775,594 | B1 | * | 8/2004 | Conigliaro ........... H04M 11/007 |
| | | | | 700/287 |
| 7,096,188 | B1 | | 8/2006 | Schlick et al. |
| 7,529,722 | B2 | | 5/2009 | Kofman et al. |
| 7,853,538 | B2 | | 12/2010 | Hildebrand |
| 7,873,567 | B2 | | 1/2011 | Eder |
| 8,073,721 | B1 | | 12/2011 | Lewis |
| 8,260,653 | B1 | | 9/2012 | Osterfelt et al. |
| 8,364,610 | B2 | * | 1/2013 | Grichnik ................ G06N 3/126 |
| | | | | 706/12 |
| 2002/0183988 | A1 | * | 12/2002 | Skaanning ............. G06N 7/005 |
| | | | | 703/2 |
| 2003/0037063 | A1 | | 2/2003 | Schwartz |
| 2003/0195937 | A1 | | 10/2003 | Kircher et al. |
| 2004/0015906 | A1 | * | 1/2004 | Goraya ................. G06N 5/022 |
| | | | | 706/45 |
| 2005/0075995 | A1 | | 4/2005 | Strobel et al. |
| 2006/0041857 | A1 | | 2/2006 | Huang et al. |
| 2006/0167832 | A1 | * | 7/2006 | Allen ..................... G06Q 10/04 |
| | | | | 707/999.001 |
| 2006/0195440 | A1 | * | 8/2006 | Burges ................. G06F 16/951 |
| | | | | 707/999.005 |
| 2007/0112695 | A1 | | 5/2007 | Wang et al. |
| 2009/0132662 | A1 | | 5/2009 | Sherida et al. |
| 2009/0234684 | A1 | | 9/2009 | Stoke et al. |
| 2009/0327201 | A1 | * | 12/2009 | Muthu-Manivannan ................... |
| | | | | G06N 5/025 |
| | | | | 706/52 |
| 2011/0071969 | A1 | | 3/2011 | Doctor et al. |
| 2012/0232948 | A1 | | 9/2012 | Wolf et al. |
| 2012/0317058 | A1 | | 12/2012 | Abhulimen |
| 2015/0286949 | A1 | | 10/2015 | Ivanov |

OTHER PUBLICATIONS

Lee, et al. 'A fuzzy AHP and BSC approach for evaluating performance of IT department in the manufacturing industry in Taiwan.'; Expert Systems with Applications, v 34, #1, Jan. 2008—pp. 96-107.

PCT Search Report/Written Opinion ~ Application No. PCT/US2012/047501; dated Mar. 15, 2013; 8 pages.

Sousa, P. et al.; "Intelligent Decision Support Tool for Prioritizing Equipment Repairs in Critical/disaster Situations"; Jun. 2006: vol. 2; 12 pages.

PCT Search Report/Written Opinion ~ Application No. PCT/US/2013/052887 dated Apr. 21, 2014 ~ 9 pages.

Xirogiannis, G., et al., Fuzzy Cognitive Maps in Business Analysis and Performance-driven Change, (Research Paper), Aug. 2004, pp. 334-351, vol. 51, No. 3.

Chung, Fu-lai, et al., "Deriving Multistage FNN Models From Takagi and Sugeno's Fuzzy Systems", IEEE ICFS '98 [Published 1998] [Retrieved Online Jun. 2019] <URL: https://ieeexplore.ieee.org/abstract/document/686299>, (Year: 1998), 6 pages.

Chung, Fu-Lai, et al., "On Multistage Fuzzy Neural Network Modeling", IEEE Transactions on Fuzzy Systems, vol. 8, Issue 2, [Published Apr. 2000] [Retrieved Jun. 2019] <URL: https://ieeexplore.ieee.org/abstract/document/842148>, (Year: 2000), 18 pages.

Ranmanesh, Seyed Hossein, et.al, "A Framework of Fuzzy Neural Network Expert System for Risk Assessment of ERP Projects", 2011 IEEE 3rd International Conference on Communication Software and Networks, Xi'an, [retrieved online Jun. 18, 2018] <URL:http://ieeexplore.ieee.org/stamp/stamp.jsp?tp=&arnumber=6014862&isnumber=6013532>, 2011, pp. 118-122.

Liu, Xiaoqing, et al., "An Intelligent Early Warning System for Software Quality Improvment and Project Management", Proceedings. 15th IEEE International Conference on Tools with Artificial Intelligence, [retreived online Jun. 18, 2018] <URL:http://ieeexplore.ieee.org/stamp/stamp.jsp?tp=&arnumber=1250167 &isnumber=27974>, 2003, pp. 32-38.

* cited by examiner

PROBLEM ANALYSIS AND PRIORITY DETERMINATION BASED ON FUZZY EXPERT SYSTEMS

BACKGROUND

In a variety of fields or domains, problem management is applied for execution and administration of various stages of the life cycle of problems. Problem management techniques are directed at a solution of problems and a prevention of resulting incidents. Problems may generally be defined as a change of a normal state or as a deviation of some performance from the expected normal processing. Since problems may be related to any kind of state or processing, individual solutions of problems may typically have a certain significance that reflects a necessity for a prioritized solution of that problem. Therefore, problems may be analyzed to determine the significance of a problem and to enable a privileged treatment of problems with an increased significance.

In order to perform problem analysis, several questions related to the problem have to be assessed. The answers to these questions typically require a certain level of skills and experience of an expert in the field or domain of the problems. However, the answers may not always be provided in a satisfying way, since experts may not be readily available during registration of problems. Rather, most of the persons registering problems are not experts or do not possess all necessary skills and knowledge to perform a detailed and objective analysis. For example, problems in the area of information technology (IT) infrastructures are typically complex and need a wide and detailed expert knowledge in order to allow for a suitable problem analysis.

Since IT infrastructures are of systemic importance for organizations and business entities and errors or failure of an IT infrastructure may have serious implications, an optimized prioritization and solution of IT-related problems is required. Also, from the point of view of IT service management, problem management may be subject to service level agreements (SLA) between the organization or business entity and a manager of the IT infrastructure. According to the SLA, problems may require a fast response and an immediate solution of most critical problems.

Approaches for problem analysis and priority determination known in the art require an expert to define several input variables, which are thereafter typically processed with a pre-defined static matrix in order to determine a priority of the problem. For example, the values of two input variables may be used as an index for columns and rows of a static matrix, respectively, and the indexed entry in the matrix may be used to determine a priority of the problem specified by the input variables. These static approaches require a complete knowledge of the circumstances and characteristics of each problem, i.e. the expert has to define exact values for each input variable, if a value is not known, it has to be guessed. Yet, in this case the corresponding input variable is thereafter treated as a fixed selected value and may therefore lead to inappropriate results.

In addition, known systems suffer from the limited number of input variables that may not be sufficient to precisely define the problem. Since such systems are restricted to a set of static values, such as the entries of a static matrix, it may also be difficult to adapt these systems to new or varying conditions.

BRIEF DESORPTION OF THE DRAWINGS

Figure 2:
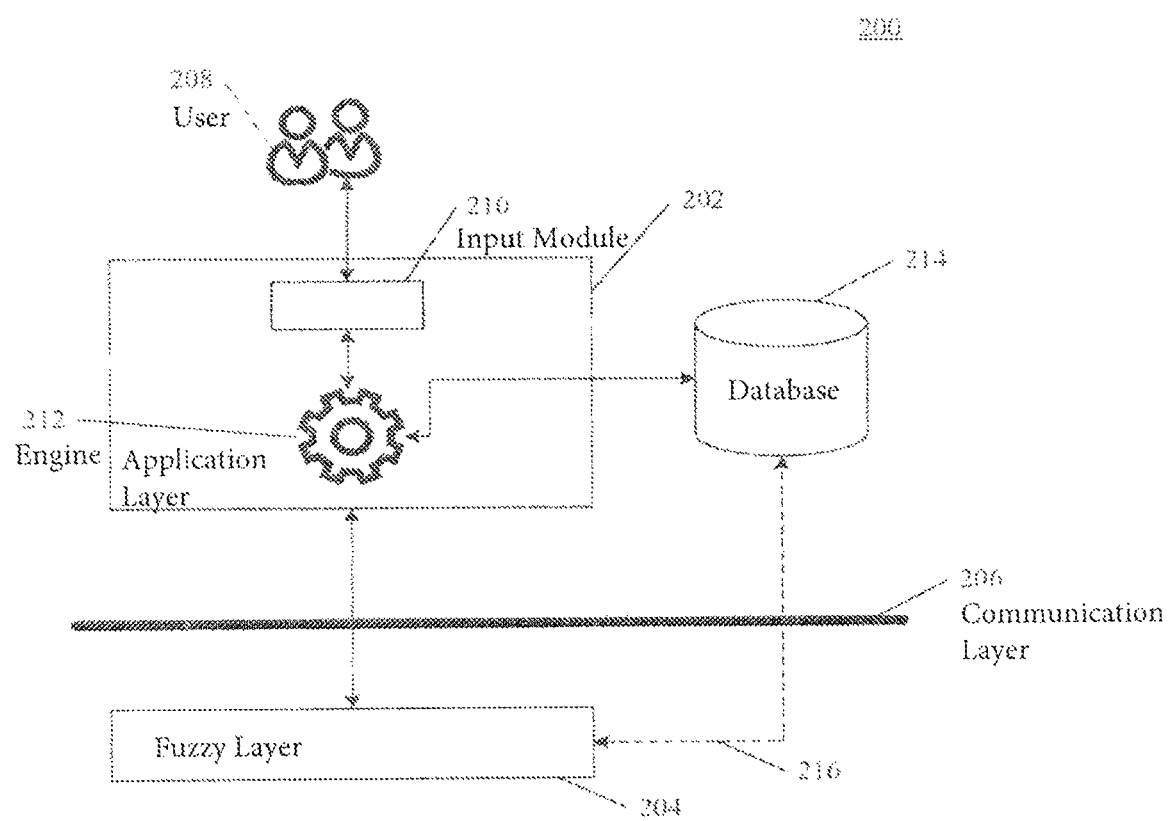
Figure 3:
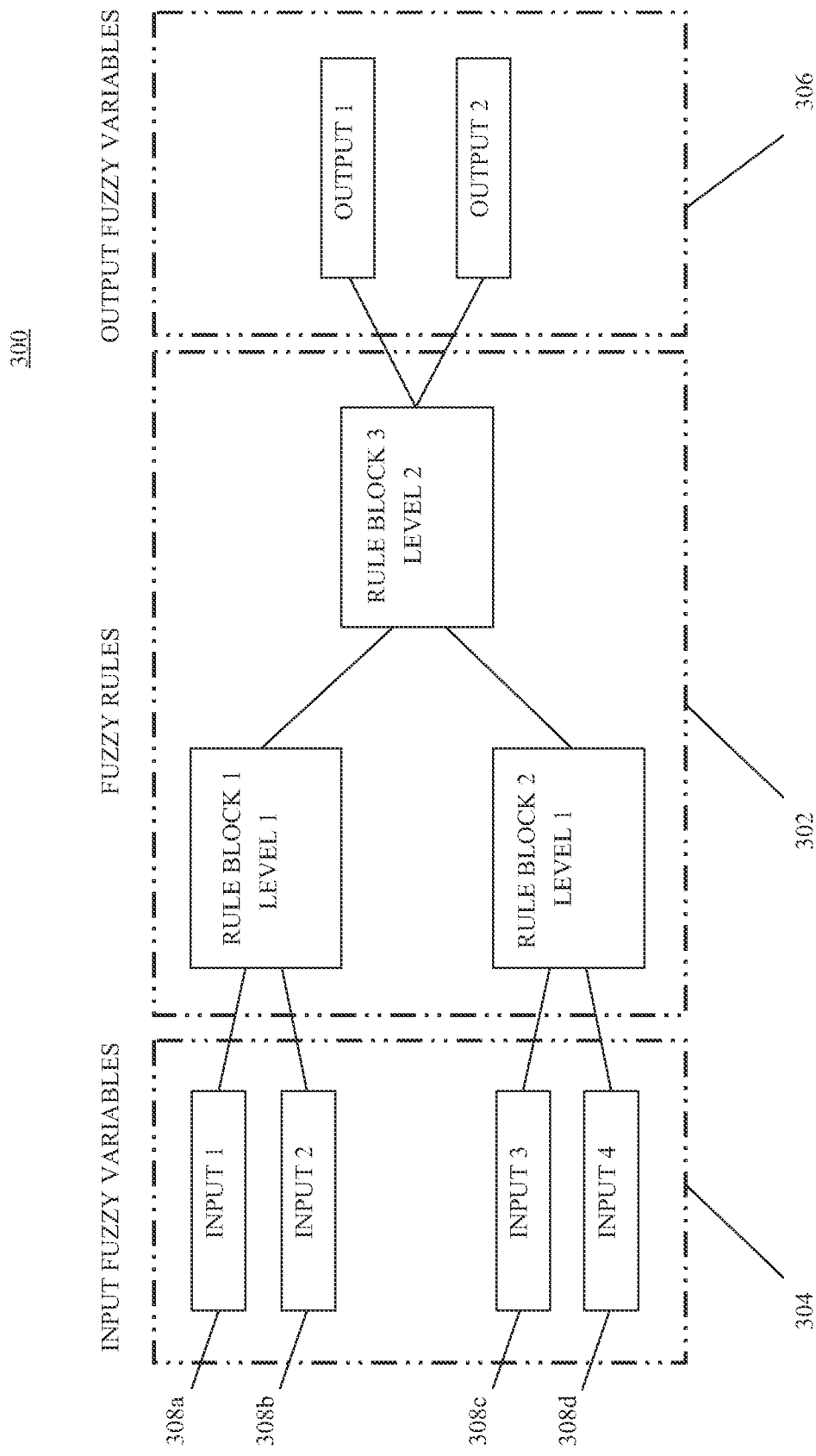
Figure 4A:
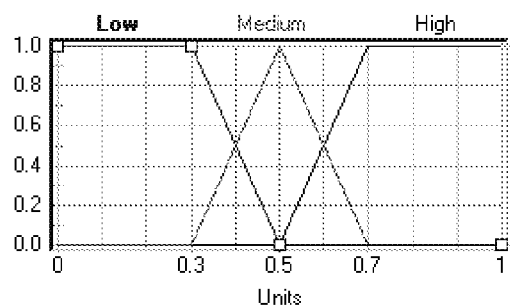
Figure 4B:
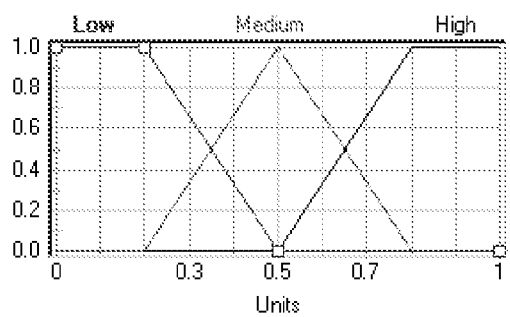
Figure 4C:
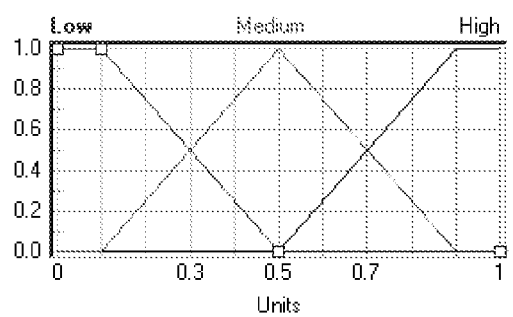

FIG. 1 shows a flowchart directed at a method for problem analysis according to one example;

FIG. 2 schematically shows a system for problem analysis according to one example;

FIG. 3 illustrates, in the form of a schematic block diagram, components of a fuzzy expert system according to one example; and FIGS. 4A, 4B, and 4C show membership functions of a fuzzy set applied in a problem analysis method according to one example.

DETAILED DESCRIPTION

Various embodiments will be described below by referring to several examples.

The present disclosure relates to a method for analysis of problems which is based on values for a plurality of input parameters specifying a problem, which are analyzed with a fuzzy expert system. The analysis leads to a calculation of a fuzzy result that includes a value of a linguistic variable and a crisp value. A priority of the problem is determined based on the value of the linguistic variable and the crisp value of the fuzzy result.

The problem analysis method enables a correct prioritization of problems, which is one of the most critical parts of problem management. It represents an intelligent technique which allows for suitable and objective conclusions on problem priority and a more realistic quantification of problems by analyzing the input parameters with a fuzzy expert system and assessing the priority based on a resulting linguistic variable and a numerical crisp value.

The method further greatly decreases the number of incorrectly prioritized problems. It deals with ambiguity as well as incomplete and incorrect information by analyzing the received values using the fuzzy expert system, which reflects the required expert knowledge. Therefore, the human operator providing the values for the input parameters neither needs to be an expert in the field, nor has to have a broad knowledge in order to precisely define the problem priority. Hence, the method decreases the dependency on experts for problem analysis and management and greatly reduces corresponding support costs.

Fuzzy expert systems may be used for analysis of input data based on principles of fuzzy logic. The general concepts of fuzzy logic are applicable in different areas, such as control theory or artificial intelligence, and enable a representation of imprecise or uncertain knowledge. Fuzzy logic is capable of implementing processes that closely resemble the way of human thinking and decision making and therefore enable approximate reasoning. A fuzzy expert system may receive as input a plurality of values, such as numerical values or linguistic values. Linguistic values may be defined as values of a linguistic variable, which may be represented by a set of terms defining states or characteristics of a state, such as "low", "medium", and "high". Correspondingly, linguistic variables may be defined in natural language and are also referred to throughout this specification as fuzzy variables. The input values may be mapped onto a plurality of fuzzy sets and processed according to fuzzy rules in order to calculate a fuzzy result.

Fuzzy sets are used in fuzzy expert systems and permit a graded designation of membership of each element in the fuzzy set. The degrees of membership of respective elements are described with corresponding membership functions valued in the interval [0,1]. Hence, a fuzzy set may be described as a pair $(U,m)$, where $U$ is a set and $m:U \rightarrow [0,1]$ defines the membership functions, wherein for each $x \in U$ the value $m(x)$ defines the grade of membership of $x$ in $U$. Accordingly, each element of the fuzzy set may have a certain grade of membership. Hence, as a result of the mapping of the input values onto a fuzzy set, the input values, such as numerical or non-fuzzy crisp input values, may be converted to a fuzzy set using fuzzy linguistic variables, fuzzy linguistic values, which may also be referred to as terms, and membership functions. For example, each linguistic or fuzzy variable may have several fuzzy values and for each one, membership functions may be used to map the input values, such as the non-fuzzy crisp input values, to the fuzzy linguistic values or terms.

According to an embodiment, the value of the resulting linguistic variable is used to classify a problem into one of a plurality of categories and the crisp value is used to grade the problem within the respective category. For example, the value of the linguistic variable may refer to one of a plurality of categories, such as "insignificant", "low", "medium", "high", and "critical". Correspondingly, the problem may be classified into the category corresponding to the linguistic variable. The crisp values of the problem may be used to achieve a finer prioritization within each category, for example, by comparing the crisp values of all problems within one category. A crisp value may be computed based on a defuzzification of at least one fuzzy set and corresponding membership degrees used by the fuzzy expert system during computation of the fuzzy result. Hence, further to the linguistic output, a numerical defuzzified value is determined and used for a more precise prioritization of the problem.

In one embodiment, a fuzzy expert system is selected from a group of fuzzy expert systems based on a type and a number of the plurality of input parameters. For example, values for a certain number of input parameters, such as two, four, six, and eight input parameters, may be required as input in order to enable an analysis of the specified problem. Furthermore, the values may be related to a certain type of input parameter, such as a value indicating an urgency of the problem and a value indicating a customer user's impact, which may relate to affected users. Given the number of input parameters and their type, a corresponding fuzzy expert system may selected for determination of the priority of the respective problem.

FIG. 1 shows a flowchart of a problem analysis method according to an example. The method 100, which may be a computer-implemented method, starts at block 102. The method 100 may, for example, be triggered by a computer-implemented process implementing a problem management method or by a human operator providing any kind of input data related to a problem.

Corresponding values specifying the problem may be received at block 104. The values may, for example, be related to a plurality of input parameters which determine the problem or may constitute a plurality of input words which in combination may define a description of the related problem. The values may be received 104 from an operator or user. Also, a first group of values may be received from the operator and another group of values may be retrieved from a data base or data store or another automated input means, such as an application monitoring a status of entities to which the problem may relate.

The values of the plurality of input parameters may be analyzed at block 106. The analysis may fully interact with a fuzzy expert system 108 in order to calculate a fuzzy result. For example, the values of the plurality of input parameters may be mapped onto a plurality of fuzzy sets and a set of fuzzy rules defined by the fuzzy expert system may be applied to compute the fuzzy result, for example by combining output fuzzy sets of each fuzzy rule. The fuzzy expert system may furthermore define an inference engine which specifies a hierarchy for the application of the fuzzy rules.

The fuzzy result may further include a linguistic value provided at block 110a. The linguistic value 110a may be computed from a resulting fuzzy and corresponding membership degrees as determined by the fuzzy expert system 108. For example, output fuzzy sets of fuzzy rules may be combined into a single output fuzzy set, representing the linguistic value 110a. The results of each rule may be combined in different ways, such as using one of a maximum method, a bounded sum method, and a normalized sum method and other suitable methods. Also, the membership degrees of all members of the resulting fuzzy set may be analyzed in order to derive a further approximation of the linguistic value 110a.

In addition, a crisp value may be provided at block 110b. The crisp value 110b may refer to a numerical or real value which may be derived by a defuzzification of the resulting fuzzy set and its membership degrees. In order to determine the crisp value 110b, the geometry and shape of the membership functions of the resulting fuzzy set may be analyzed and superimposed to derive a numerical value, for example, from a centroid resulting from the superimposed functions.

Based on both values, the linguistic value 110a and the crisp value 110b, a priority of the problem may be determined in block 112. For example, the problem may be classified according to the linguistic value 110a and, subsequently, the problem may be graded using the crisp value 110b. Hence, the linguistic value 110a may be used to determine a class or category for each problem and the crisp value 110b may be used to index the problem in that class or category. Yet, the crisp value 110b may also be used to further affect the determined class or category, such that a problem may be reclassified into a neighboring class or category if the crisp value 110b exceeds or falls below a certain threshold.

After determination of the priority 112, the method 100 completes at block 114. Upon completion, the method 100 may also pass processing and the determined priority to another management process, which may subsequently provide the analysis results to a human operator or an automated processing entity.

The method 100 or particular processing steps of the method 100 may be represented as machine-readable instructions, which may be executed within one single thread or process, as well as within particular threads or processes on a plurality of processing means such as by processing units or processor cores of a processing unit, as well as by other software and/or hardware processing resources and combinations thereof.

Even though method 100 has been described as a sequence of processing steps, it is to be understood that the respective processing steps may be executed in a different order. Also, particular processing steps of method 100 may be executed concurrently. For example, the linguistic value 110a and the crisp value 110b may be determined sequentially or in parallel. Furthermore, not all of the steps are required in all of the embodiments described.

The present disclosure further relates to a computer-readable medium having instructions stored thereon, wherein said instructions in response to execution by a computing device, cause said computing device to perform a method for problem management and analysis which may be similar to the examples of methods described above, such as the method 100 of FIG. 1. In response to the execution, the computing device according to an example maintains a plurality of descriptions of problems, each description comprising a plurality of input words specifying the problem, and prioritizes the problems based on linguistic values and numerical values of fuzzy results, which are determined for each maintained description of a problem by mapping the respective plurality of input words onto a plurality of fuzzy sets and calculating a fuzzy result by applying a set of fuzzy rules to the plurality of fuzzy sets, wherein the fuzzy result includes a linguistic value and a defuzzified numerical value indicative of the priority of the problem.

In addition, the present disclosure relates to a problem analysis system with an application layer, a communication layer and a fuzzy layer. The application layer includes an engine to maintain problem descriptions based on priorities of the respective problems, each description including a plurality of values for input parameters specifying the respective problem. The fuzzy layer is coupled to the application layer via the communication layer. The fuzzy layer includes a fuzzy expert system and a communication interface to receive from the application layer a plurality of values of a problem description, to analyze the plurality of values with the fuzzy expert system and to transmit a result from the fuzzy expert system indicative of a priority of the problem back to the application layer. The result includes a value of a linguistic variable and a crisp variable, such that the priorities are determined based on the value of the linguistic value and the crisp value of the fuzzy result.

FIG. 2 schematically shows a block diagram of a similar system for problem analysis according to an example. The system 200 may comprise three layers, an application layer 202, a fuzzy layer 204 and a communication layer 206.

A human operator or customer, such as user 208, may access the application layer 202 via an input module 210 in order to provide problem descriptions including a plurality of values for input parameters that specify respective problems. The application layer 202 may represent the part of the system 200 with which the user 208 may interact and defines a location, where the user 208 may create, review and manage problems. The application layer 202 may be implemented as a single application, which may be executed on a computer, or may be represented as a plurality of processes that are directed to a certain workflow of problem management and analysis. The input module 210 may, for example, be implemented as an input interface of the application layer 202 and may be communicatively coupled to an input terminal operated by the user 208. Also, the user 208 may use a client device (not shown) to enter the problem descriptions, which may thereafter be transferred from the client device to the input module 210 via a network.

The processing of system 200 may be triggered whenever the user 208 opens a new problem description or record using input module 210 of the application layer 202. For some of the input parameters that are necessary for the definition of a problem, the user 208 may enter the corresponding linguistic or numerical values, including a number of affected users and affected configuration items. In addition, a value of an input parameter or several values may be derived automatically, like a value for current similar unresolved problems.

The application layer 202 may comprise an engine 212 which maintains the problem descriptions based on priorities of the respective problems. The engine 212 may be implemented as an encapsulated functional entity, which may run independently of processes of the application layer 202 and periodically update the management process. The engine 212 may, for example, be implemented as an independent thread or a process within the application layer 202.

The problem descriptions may be stored in a data base 214 or any other local or emote storage means. The data base 214 may be implemented as part of the application layer 202 or may be realized on a separate processing entity, such as a data base server.

As soon as a new problem description is received via the input module 210 from user 208, the engine 212 may store the problem description in the data base 214, communicate with the fuzzy layer 204 via the communication layer 206 and provide the received plurality of values of the problem description to the fuzzy layer 204. The engine 212 may as well directly push the received values to the fuzzy layer 204, and postpone storage of the problem description. The engine 212 or the application layer 202 may directly transmit the respective values of the problem description to the fuzzy layer 204 or may transmit a key to the fuzzy layer 204, which enables the fuzzy layer 204 to retrieve the problem description from the data base 212, as indicated by a dotted line 216.

The communication layer 208 may represent an interface or environment through which the application layer 202 and the fuzzy layer 206 may communicate. The application layer 202 and the fuzzy layer 204 may send data and messages in both directions via the communication layer 206 including any problem analysis parameters and resulting values used for determination of a priority of a problem, such as linguistic values in combination with numerical values. The communication may be encrypted by the communication layer 206. Likewise, the communication layer 206 may be realized as a secure channel.

The fuzzy layer 204 may include a fuzzy expert system (not shown), which performs the analysis based on previously gathered and structured expert knowledge related to problem management and analysis that is represented as corresponding fuzzy sets, including their membership functions, fuzzy rules, fuzzy inference engines, and defuzzification methods. The fuzzy expert system may analyze the values and compute a fuzzy result, such as a resulting fuzzy set with corresponding membership degrees.

The system 200 may use a set of linguistic input parameters specifying at least an urgency of the problem and an impact of the problem, for example an indication of customer users impact which may be related to the affected users. In addition, further input parameters may be related to at, least one of an indication of a service provider users impact, affected configuration items or a number of items affected by the problem, similar unresolved problems or a number of similar unresolved problems, a security impact, a productivity impact, and a reputation impact. Each of the linguistic variables may be modeled using a plurality of terms, for example three terms, including at least one of triangular, trapezoidal, and sinusoidal membership functions. The respective membership functions may be related to linguistic values, such as "low", which may be modeled using a trapezoidal membership function, "medium", which may be modeled using a triangular membership function, and "high", which may be modeled using a trapezoidal membership function.

The resulting fuzzy variable n nay represent an indication of the problem priority and may, for example, include the following fuzzy values or terms labeled as "very low", "low", "average", "high", and "critical". Each of them may be modeled with at least one of triangular, trapezoidal, and sinusoidal membership functions. For example, the fuzzy value "insignificant" may be modeled as a trapezoidal function, the fuzzy value "low" may be modeled as a triangular function, the fuzzy value "medium" may be modeled as a triangular function, the fuzzy value "high" may be modeled as a triangular function, and the fuzzy value "critical" may be modeled as a trapezoidal function.

The fuzzy layer 204 or the fuzzy expert system may further derive a linguistic value based on the resulting fuzzy set and a crisp value based on a defuzzification of the resulting fuzzy set. The results may be transferred via the communication layer 206 back to the application layer 202 or the engine 212 for further processing and priority determination. Both resulting values may be set in the problem description or record and may be used by the application layer 202 or the engine 212 to prioritize the problem with regard to other managed problem.

Based on the results and the determined priorities of all existing problems, the problems may be ordered for execution according to their priority. For example, the system 200 may use the resulting linguistic value to define groups or classes of problems and may further use the numerical value to rate the problems in each group or class. Hence, problems may be grouped by the resulting linguistic value and additionally prioritized or rated based on the numerical crisp value. The results may be provided by the application layer 202 to the user 208 according to the prioritization. Accordingly, the defuzzified numerical crisp value calculated in the fuzzy layer 204, for example by the fuzzy expert system, enables a more precise prioritization as well as an improved grouping of the problems managed by the system 200. In that way, the user 208 or an operator managing the execution of problems may faster recognize and identify critical problems, which may be handled first or with a higher priority in order to achieve better SLA rates. Therefore, the satisfaction of users as well as the number of problems resolved within a certain SLA may be increased.

The system 200 may be applied in any domain that requires an intelligent analysis and management of problems, for example, IT service management related to IT infrastructure problems, such as problems related to IT hardware, IT software, and combinations thereof. By utilizing and adapting the fuzzy expert system to the processes of problem analysis found in the respective domain, the system 200 enables an improved and intelligent use of expert knowledge for problem analysis and may automatically deal with ambiguity related to incomplete and incorrect input data. The expert knowledge may be internally defined in the fuzzy expert system as dedicated fuzzy rules and fuzzy sets. The ambiguity may be, for example, defined as a condition which indicates that user 208 has only a limited knowledge about particular characteristics of a problem or that it is not possible to more precisely define a current state or future results related to the problem. By taking the ambiguity into account, the system 200 allows for determination of an objectively defined problem priority.

Even though system 200 has been described with regard to particular layers and processing components, it is to be understood that not all structural features and functional entities are required in all of the embodiments. For example, the application layer may be controlled by a plurality of users and may comprise further modules to enable input of the input parameters and/or output of the priorities. Furthermore, system 200 may be realized as a network-based or distributed server system, such that user 208 may operate a client device, which is coupled via a network to the application layer 202. In addition, the application layer 202, may be operated by user 208 to receive problem descriptions and may deliver the resulting prioritizations of problems to another user or to another group of users via another output interface. Similarly, layers 202, 204, 206 may be implemented as modules on a single machine, or may be implemented on remote computing resources or processing resources that may, for example, communicate with each other via a network. Also, at least some of the components of system 200 may be configured to perform a method for problem management and analysis according to examples described above, such as the method 100 of FIG. 1.

Further to the examples described with reference to FIG. 2, a fuzzy layer, which may be similar to the fuzzy layer 204, may comprise a plurality of fuzzy expert systems which may be selected based on the number and the type of the input parameters provided. Each fuzzy expert system may be, for example, adapted to a certain number and type of input parameters, such as two, four, six, and eight input parameters. According to an example, the fuzzy layer may include four fuzzy expert systems for each number of input parameters. One of these fuzzy expert systems may, for example, be selected and applied if two input parameters are used defining an urgency of the problem and a customer users impact, which is indicative of a number of affected users. Both input parameters may be combined in pairs.

Another fuzzy expert system, which may be selected in the fuzzy layer, may be responsive to four input parameters defining a service provider users impact, which may be combined in pairs with the customer users impact (affected users), as well as the urgency input parameter, which may be combined in pairs with an input parameter indicative of similar unresolved problems.

Yet another fuzzy expert system of the fuzzy layer may be responsive to six input parameters, specifying the service provider users impact, which may be combined in pairs with the customer users impact (affected users), as well as the input parameter indicative of the urgency of the problem, which may be combined in pairs with the indication of similar unresolved problems, as well as an indication of affected configuration items, which may be combined in pairs with a security impact.

Furthermore, the fuzzy layer may comprise a further fuzzy expert system responsive to eight input parameters, specifying the service provider users impact, which may be combined in pairs with the customer users impact (affected users), as well as the indication of the urgency, which may be combined in pairs with the indication of similar unresolved problems, as well as the indication of affected configuration items, which may be combined in pairs with the indication of security impact, as well as an indication of a productivity impact that may be combined in pairs with an indication of reputation impact.

According to another example similar to the examples described above, a fuzzy layer may include three fuzzy expert systems, wherein at least one of the fuzzy expert systems is responsive to two input parameters, and two fuzzy expert systems are each responsive to at least one of four, six, and eight input parameters, similar to the fuzzy expert systems described above.

Furthermore, a fuzzy layer of one example similar to the examples described above may include two selectable fuzzy expert systems, wherein one fuzzy expert system is responsive to two input parameters and one fuzzy expert system is responsive to at least one of four, six, and eight input parameters, similar to the fuzzy expert systems described above.

The systems and approaches according to examples described above and the respective fuzzy expert systems provide for good calculation capabilities, since they enable a parallel calculation and processing, such as a parallel fuzzy rules execution. The systems and approaches further enable a processing of problem descriptions with vague information with a higher level of precision. Therefore, less experienced specialists are necessary for building complex models and less time for building designs and prototypes of models is required. Also, less time for discovering and removing errors and less time for checking and improving the models is required.

FIG. 3 illustrates, in the form of a schematic block diagram, components of a fuzzy expert system according to one example. The fuzzy expert system 300, which is, for example, applicable in the system described in examples with regard to FIG. 2, defines a set of fuzzy rules 302 that are applied to a set of input fuzzy variables 304 in order to generate output fuzzy variables 306, which may be used for priority determination.

The input fuzzy variables may include de an indication 308a of an impact on client's users and an indication 308b of air impact of provider's users. In addition, the set of input fuzzy variables 304 may include an indication of similar unresolved problems 308c and an indication of urgency 308d, which may relate to a time for execution of the problem. Hence, the fuzzy expert system 300 may be responsive to four input fuzzy variables 304.

In a first hierarchical step, the indications 308a and 308b may be combined in pairs and subjected to one of the fuzzy rules 302. Furthermore, indications 308c and 308d may be combined in pairs and subjected to another of the fuzzy rules 302 in the first hierarchical step. Both results may be subjected to yet another of the fuzzy rules 302 to generate the output fuzzy variables 306 in a second hierarchical step.

The result of each application of one of the fuzzy rules 302 may be another fuzzy set with respective degrees of membership. The membership functions of each fuzzy set may be defined as triangular, trapezoidal or sinusoidal functions or any other function suitable to describe a degree of membership.

FIGS. 4A, 4B, and 4C show membership functions of a fuzzy set applied in a problem analysis method according to one example. In particular, FIGS. 4A, 4B, and 4C show three different models with different grades of fuzziness, which may be applied to input fuzzy variables, for example, to the input fuzzy variables 304 as discussed with reference to FIG. 3.

As shown, a fuzzy variable according to the example may be defined using three linguistic values "low", "medium", and "high", with different membership functions. According to FIG. 4A, the membership function for the linguistic value "medium" may be defined as a triangular function represented with three points (0.3, 0.5, 0.7), with the intervals [0.3, 0.5] and [0.5, 0.7] defining the linear increase from 0.0 to 1.0 and linear decrease from 1.0 to 0.0, respectively. Furthermore, the function has a maximum of 1.0 at 0.5 and is 0 outside of the aforementioned intervals. The membership functions for the values "low" and "high" are defined as trapezoidal functions. Similarly, the membership functions of FIG. 4B are defined as trapezoidal functions for the values "low" and "high" and the triangular function for the value "medium" is given as (0.2, 0.5, 0.8). Likewise, the membership functions of FIG. 4C are defined as trapezoidal functions for the values "low" and "high" and the triangular function for the value "medium" is given as (0.1, 0.5, 0.9).

The different models according to the examples described with reference to FIGS. 4A, 4B, and 4C may be applied for mapping a set of test values onto corresponding fuzzy sets. The test values may, for example, relate to a plurality of input parameters defining test problems. After mapping of the test values a fuzzy expert system may be used to calculate test results for each model. The individual test results may be rated based on the resulting overall prioritization of the test problems which may be compared to an optimal prioritization. The model with a best rating may be selected and applied in the corresponding fuzzy expert system for problem analysis and priority determination for real problems. For example, the model defined in FIG. 4B has been determined to deliver optimal results with a set of test cases.

What is claimed is:

1. A computer-implemented method for analysis of problems, comprising:
   receiving, by a computing system, values for a plurality of input parameters specifying a problem;
   analyzing, by the computing system, the values of the plurality of input parameters with a fuzzy expert system thereby calculating a fuzzy result that includes a value of a linguistic variable based on the fuzzy result and a crisp value based on a defuzzification of the fuzzy result, wherein the fuzzy expert system is selected from a group of fuzzy expert systems based on a number of the plurality of input parameters and types of the plurality of input parameters, wherein the types of the plurality of input parameters include at least one of an urgency of the problem or an impact of the problem;
   determining, by the computing system, a priority of the problem, wherein the priority is determined based on a combination of the value of the linguistic variable and the crisp value of the fuzzy result,
      wherein the problem is classified into a category that corresponds to the value of the linguistic variable of a plurality of categories, and
      wherein, after the problem is classified into the category, the problem is graded within the category based on the crisp value;
   ranking, by the computing system, the problem among a set of other problems for which respective priorities were determined, the problems being ordered for execution based on their respective priorities, wherein each problem in the set is assigned to a respective category and a corresponding grade within the respective category; and
   providing, by the computing system, at least one of the ranked problems among the set of other problems.

2. The method of claim 1, wherein the analyzing of the values includes mapping the plurality of input parameters onto a plurality of fuzzy sets and applying a set of fuzzy rules, wherein the fuzzy rules are defined by the fuzzy expert system.

3. The method of claim 2, wherein the fuzzy rules are applied according to a hierarchy specified by a fuzzy inference engine of the fuzzy expert system.

4. The method of claim 2, wherein the mapping of the plurality of input parameters includes, for each input parameter, defining a plurality of membership functions based on a type of the input parameter.

5. The method of claim 4, wherein the plurality of membership functions includes at least one of a triangular, a trapezoidal, and a sinusoidal membership function.

6. The method of claim 1, wherein the input parameters are defined as linguistic variables.

7. The method of claim 1, wherein the crisp value is computed based on defuzzification of at least one fuzzy set and corresponding membership degrees.

8. The method of claim 1, wherein the fuzzy result is based on at least one fuzzy set, including at least one of a triangular, a trapezoidal, and a sinusoidal membership function.

9. The method of claim 1, wherein at least some of the input parameters are related to a description of a deviation defining the problem, the input parameters including at least one of a user's impact and the urgency of the problem.

10. The method of claim 1, wherein the analyzing of the values further includes determining similar problems based on at least one of the input parameters.

11. The method of claim 1, further comprising applying a plurality of models with different grades of fuzziness to the input parameters, for each model, analyzing a set of test values for the plurality of input parameters with the fuzzy expert system thereby calculating a test result, rating the test results for each model, and selecting one of the plurality of models based on the rating.

12. The method of claim 1, wherein, when a problem classified into a category based on an associated linguistic value has a corresponding crisp value that exceeds or falls below a threshold, the problem is reclassified into a neighboring category associated with a second linguistic value.

13. A non-transitory computer-readable medium having instructions stored thereon, wherein said instructions, in response to execution by a computing device, cause said computing device to perform a method comprising:
  maintain a plurality of description of problems, each description comprising a plurality of input words specifying the problem;
  for each maintained description of a problem, map the plurality of input words onto a plurality of fuzzy sets, and calculate a fuzzy result by applying a set of fuzzy rules to the plurality of fuzzy sets, wherein the fuzzy result includes a combination of a linguistic value of a linguistic variable based on the fuzzy result and a defuzzified numerical value of the fuzzy result indicative of a priority of the problem, wherein in order to prioritize the problems said computing device is to use respective combinations associated with the problems to:
    classify the problems according to respective linguistic values into a set of categories, and
    after the problems are classified into the set of categories, to grade the problems of each category of the set of categories according to respective defuzzified numerical values;
  prioritize the problems based on the linguistic values and the numerical values of the respective fuzzy results;
  rank the problems for which respective priorities were determined, the problems being ordered for execution based on their respective priorities, wherein each problem is assigned to a respective category and a corresponding grade within that category;
  analyze a number of input words specifying a respective problem of the problems and types of the input words of the respective problem, wherein the types of the input words include at least one of an urgency of the respective problem or an impact of the respective problem; and
  select a fuzzy expert system from a group of fuzzy expert systems based on the analysis, wherein the fuzzy expert system defines the set of fuzzy rules; and
  provide at least one of the ranked problems among the set of other problems.

14. The medium of claim 13, wherein said computing device is further to receive a description of a further problem, determine a priority of the further problem, and prioritize the further problem by comparing the determined priority with priorities of the maintained problems.

15. The medium of claim 13, wherein said computing device is further to, when a problem classified into a category based on an associated linguistic value has a corresponding crisp value that exceeds or falls below a threshold, reclassify the problem into a neighboring category associated with a second linguistic value.

16. A problem analysis system, comprising:
  at least one processor;
  at least one memory comprising instructions, which, when executed, are configured to cause the at least one processor to implement:
  an application layer including an engine to maintain problem descriptions based on priorities of the respective problems, each description including a plurality of values of input parameters specifying the respective problem;
  a communication layer;
  a fuzzy layer coupled to the application layer via the communication layer, said fuzzy layer including a fuzzy expert system and a communication interface to receive a plurality of values of a problem description from the application layer, to analyze the plurality of values with the fuzzy expert system and to transmit a result from the fuzzy expert system indicative of a priority of the problem back to the application layer, wherein the result includes a combination of a value of a linguistic variable based on the result and a crisp value based on a defuzzification of the result and the priority is determined based on the value of the linguistic variable and the crisp value of the fuzzy result,
    wherein the value of the linguistic variable is used to classify the problem into a category of a plurality of categories,
    wherein the crisp value is, after the problem is classified into the category of the plurality of categories, used to grade the problem within the category,
    wherein the fuzzy expert system is selected from a group of fuzzy expert systems based on a number of a plurality of input parameters and types of the plurality of input parameters, and
    wherein the types of the plurality of input parameters include at least one of an urgency of the problem or an impact of the problem; and
  a presentation layer including an engine for ranking the problem among a set of other problems for which respective priorities were determined, the problems being ordered for execution based on their respective priorities, wherein each problem in the set is assigned to a respective category and a corresponding grade within that category, wherein the at least one processor provides at least one of the ranked problems among the set of other problems.

17. The system of claim 16, wherein the application layer further includes an input module to receive a problem description from a user of the system, and to provide the problem description to the engine.

18. The system of claim 16, wherein the problems are related to an IT infrastructure including at least one of IT hardware, IT software, and combinations thereof.

19. The system of claim 16, wherein, when a problem classified into a category based on an associated linguistic value has a corresponding crisp value that exceeds or falls below a threshold, the problem is reclassified into a neighboring category associated with a second linguistic value.

* * * * *